July 17, 1956 O. KORNEI 2,754,569

METHOD OF MAKING A MAGNETIC TRANSDUCER HEAD

Filed Oct. 21, 1952

INVENTOR.
OTTO KORNEI
BY Eber J. Hyde
ATTORNEY 2,754,569

METHOD OF MAKING A MAGNETIC TRANSDUCER HEAD

Otto Kornei, Cleveland Heights, Ohio, assignor, by mesne assignments, to Clevite Corporation, Cleveland, Ohio, a corporation of Ohio Application October 21, 1952, Serial No. 315,994

6 Claims. (Cl. 29—155.57)

This invention pertains to a transducer head for magnetic recording and reproducing purposes.

An object of this invention is to provide a very small magnetic transducer head which may readily be manufactured in large quantities by mass production techniques to produce heads which are very uniform in quality.

Another object of my invention is to provide a very small magnetic transducer head particularly for use with a motion picture projector wherein the head is adapted to record on or reproduce from a small portion of the width of the film.

Another object of the present invention is to provide a magnetic transducer head which will withstand severe mechanical vibrations and adverse atmospheric conditions.

Still another object of the invention is to provide a new and novel method of manufacturing magnetic transducer heads which produces small, uniform heads at a low cost.

For a better understanding of the present invention, together with other and further objects thereof, reference is had to the following description taken in connection with the accompanying drawings, and its scope will be pointed out in the appended claims.

An aspect of the present invention is the method of manufacturing a magnetic transducer head which includes the steps of placing within a metal housing a core of magnetizable material having at least one non-magnetic gap and carrying a winding. The core is biased toward one of the inner faces of the housing with the gap closest to the housing and held in the biased position. The housing is then filled with a hardenable casting material which is caused to harden to hold the core and the housing in a fixed position relative to each other. After the casting material has hardened the housing is closed by connecting to it one or more end plates and then portions of the housing and casting material are removed at the location of the gap in the core to expose the gap. The edges of the housing material exposed by the removal, the surface of the casting material exposed by the removal and the exposed part of the core all combine to form one smooth unbroken surface across which a magnetic tape or a magnetically coated film may move.

Figure 3:
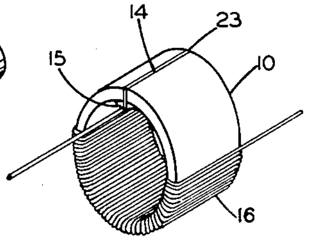
Fig. 3 is an isometric view of a portion of the tubing of Fig. 2 with an electrical winding around the core.
Figure 3A:
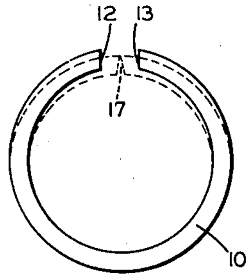
Figure 4:
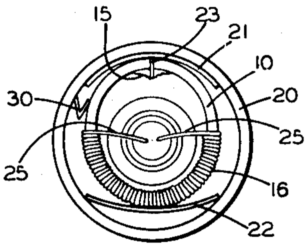
Figure 5:
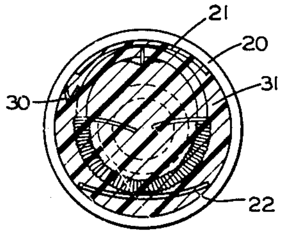
Figure 3B:
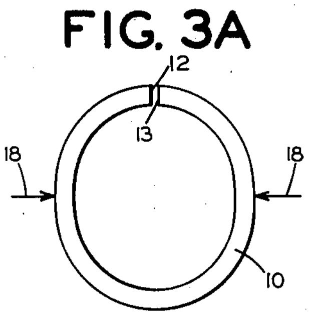
Figure 6:
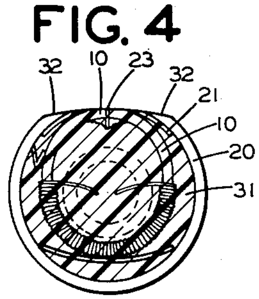
Figure 7:
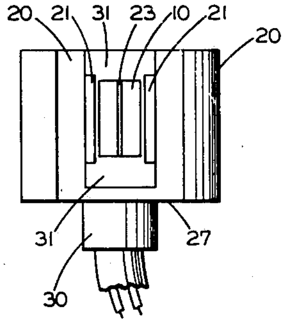
Figure 8:
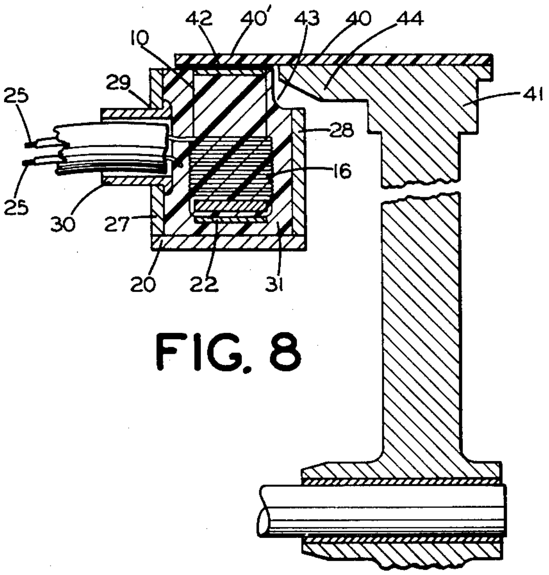
Figure 9:
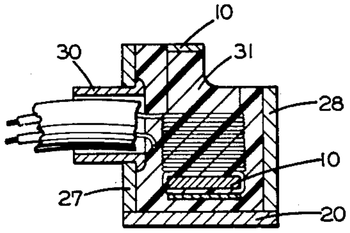

Fig. 3–A is an end view showing the relative positions of the slot faces of the tubing, and in dotted lines showing an undesirable position of the slot faces of the tubing if they are made to meet transversely by improperly compressing the tubing;

Fig. 3–B is an end view of the tubing showing the desirable position of the slot faces of the tubing after permanent predeformation in accordance with the invention;

Fig. 4 is an end view of the partially completed head;

Fig. 5 is an end view of the head after the casting material has been added;

Fig. 6 is an end view showing the head after a portion of the housing and the casting material has been ground away to expose the gap region of the core;

Fig. 7 is a top view of the head shown in Fig. 6;

Fig. 8 schematically shows the position of the transducer head in relation to a section of magnetically striped movie film and the film drive wheel;

Fig. 9 is a sectional view through a modified head showing that a portion of the head may be ground away to accommodate a narrow width record track.

Figure 1:
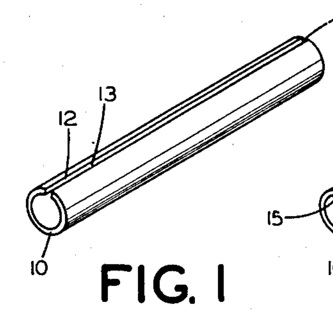
Fig. 1 is an isometric view of a section of slotted tubing from which the core may be made.

With reference to the single sheet of drawing there is shown in Fig. 1 a length of tubing 10, of high permeability magnetizable material having a longitudinal slot 11 cut preferably in a plane which includes the axis of the tube to form two planar end faces 12 and 13. After the tube shown in Fig. 1 is prepared a shim 14 of non-magnetizable material such as metal foil is placed in the gap 11, between the two end faces 12, 13, and the tubing is then carefully squeezed shut upon the shim. The thickness of the shim will thus determine the length of the non-magnetic gap in the magnetic core. The end faces 12, 13 are held tightly against the shim 14 and solder 15 is applied along the inner face to solder the two end faces of the tubing to opposite sides of the shim 14 thereby holding shim 14 in place. The tubing which has a preferred diameter of about 3/16 of an inch is then carefully cut into short sections, for instance about 1/10 of an inch in length, by sawing, grinding, or the like. The length of each of these individual ring shaped sections equals the intended track width of the head. After removing any burrs which may have been caused by the cutting operation, a thin insulating layer is applied to the ring shaped section preferably exempting, however, the regions on either side of the gap. One method of applying the insulation is to dip the lower portion of the core in lacquer which is then caused to harden. Another method is to wrap portions of the core with thin insulating tape. A toroidal winding 16, preferably in a single layer only, is then applied to the core, over the insulating layer, and symmetrically with respect to the gap 23 to form the core assembly shown in Fig. 3.

In the formation of the core assembly it is very important that the deformation of the tubing 10 to close the planar end faces 12, 13 about the shim 14, be done in such a manner that in the finished core assembly the two planar end faces 12, 13 are accurately parallel to each other.

Fig. 3–A illustrates the undesirable relationship which is obtained between the end faces 12 and 13 if the tubing 10 is improperly deformed. This produces an undesirable inverted V-shaped notch 17, resulting from the end faces 12 and 13 not being in parallel relationship to each other. Such a condition is highly detrimental because it would result in a progressive increase of the gap length when some of the core material is removed in a manufacturing step to be described later, or by natural wear caused by the abrasive nature of the record member. It is important for a magnetic transducer head to have and to maintain during its life a gap as short as possible, since the length of the gap is an important factor in the resolution and thus in the frequency range of a magnetic recording-reproducing transducer. Fig. 3–B shows the relative position of the two end faces 12 and 13 after the tubing 10 has been correctly predeformed in order to align the two end faces 12 and 13 substantially parallel to each other. The preferred method of predeforming the tubing is to apply force in the direction of and substantially at the location of the arrows 18 until the gap is closed and the tubing material slightly, but permanently, deformed into an oval. The deforming force is then removed allowing the end faces 12, 13 to spring slightly apart into the substantially parallel relationship shown in Fig. 3–B. The shim 14 is then inserted in the gap and the gap closed upon it and soldered as shown in Fig. 3. The substantially parallel relationship of the end faces 12, 13 is thus maintained. Any of the shim material 14 which may extend above the face of the tubing is then removed, the tubing is then cut up into short sections, and the coil 16 is wound on each short section, as explained before.

Another method of preventing the occurrence of the inverted V-gap is to cut slot 11 by means of a specially shaped tool. This produces confronting faces 12, 13 which converge slightly toward the tube center, by an amount sufficient to compensate for the nonparallelism which would otherwise arise upon closing of these forces upon the shim 14.

Figure 2:
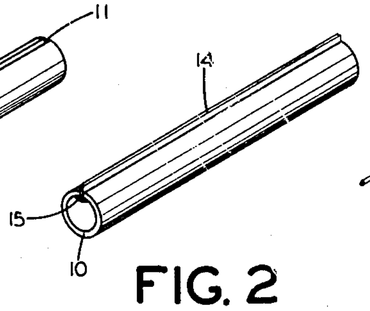
Fig. 2 shows the tubing of Fig. 1 after the spacer has been soldered into the slot.

Experience has shown that it is undesirable to utilize the extreme end portions of the tubing for the construction of magnetic heads. The reason for this lies in the fact that the ends of the tube and the ends of the solder joint are usually slightly less uniform than the center portions because of certain unavoidable limitations in the manufacturing processes. The two extreme end portions of the tubing shown in Fig. 2, should, therefore, be discarded.

After the subassembly shown in Fig. 3 has been fabricated a substantially cylindrical housing 20, preferably formed of magnetizable material, is provided as illustrated in Fig. 4. The subassembly of Fig. 3 is positioned within the housing 20, preferably with a thin piece of non-magnetic material 21 such as paper or the like placed between the core 10 and the inner face of the housing 20. A leaf spring 22 is inserted between the core 10 and the housing 20 at a location substantially diametrically opposite the gap 23. Thus, the region of the core 10 adjacent to the gap 23 is in engagement with the spacer 21, and the spacer 21 is held in engagement with the inner face of the housing 20 by means of the spring 22 pushing the core 20 against the spacer 21. The leaf spring 22 thus serves a double purpose: It urges the gap region of the core structure toward the inside wall of the housing as required, and it also secures this position until the core structure is finally locked in place by a subsequent resin casting operation. It should be noted that the positioning of the core within the housing by means of the spring 22 can also be used to determine other parameters, such as the gap being parallel to the axis of the cylindrical housing or the core being located at some predetermined distance from one end of the housing.

Electrical contact is made between the core 10 and the housing 20 by means of a small V-shaped leaf spring 30 which is wedged between the core 10 and the housing 20 or by a drop of electrically conductive paint contacting both the core and the housing. This arrangement permits convenient electrical grounding of housing and core at the same time. The subassembly consisting of the housing and the core is now ready to be filled with hardenable liquid resin. This is done with one end of the housing temporarily closed by a suitable fixture. After the resin has hardened the open ends of the housing are closed by the end plates 27 and 28 which may be soldered, cemented or pressed into place. The end plate 27 has a central opening 29 in which there is secured a hollow mounting stud 30. The ends 25 of the toroidal winding 16 are brought out through this stud.

The cover 28 preferably is a separate member secured to the housing 20, though of course this structure is not essential as the housing 20 and the cover can be a single cup-shaped piece.

In order to make the head operative a small portion of the housing 20 is removed, for instance by grinding or milling it away near the location of the gap 23 in the core 10. By this process, as shown in Fig. 6, a small amount of the hardened casting material is also removed at either side of the gap 23 and so is a very small amount of the core material. This exposes the gap 23 in the core 10, the ground edges 32 of the housing and the ground face of the hardened casting material in such manner that they form a single smooth surface across which the record material may travel. It is preferable that this single surface be arcuate in configuration in order to secure the desirable intimate contact between the record member and the gap 23, and the center of the arc should lie on a line perpendicular to the tangent to the arcuate curve at the location of the gap. 23.

The main reason for the spacer 21 between the core 10 and the housing 20 is to reduce the magnetic shunting effect of the housing on the non-magnetic gap. This shunting effect is greatly reduced because of the increase in distance between the housing and the core portions in immediate vicinity of the gap. Without the spacer 21 there would be objectionable magnetic shunting of the signal flux in the core, both in recording as well as in playback, thus reducing the sensitivity of the head.

Fig. 8 illustrates the transducer head shown in Figs. 6 and 7 in use with a film machine equipped for magnetic recording and reproducing. Reference character 40 designates a strip of film in transit over the flywheel 41. A portion 40′ of the film 40 extends beyond the edge of the flywheel 41 and the transducer head is mounted, by suitable means not shown, in resilient contact with the smooth layer of magnetizable material 42, coated onto the underneath surface of the overhanging portion 40′ of the film 40. In order for the transducer head to conform to the configuration of the flywheel 41 it may be desirable to remove a portion of the housing and a portion of the casting material at location 43. This may be done by simply grinding away a portion of the head so that the head fits underneath the flange 44 of the flywheel.

In the event that the film strip has only a very narrow sound track the head may be ground as shown in Fig. 9 to remove not only a portion of the housing 20 but also a substantial amount of the hardened casting material and a portion of the core 10 to reduce its width to any desired extent.

The method of this invention is particularly adaptable for producing very small transducer heads and has been used successfully to mass produce heads approximately 1/10 of an inch in length and 3/16 of an inch in diameter. The principles involved, however, are equally applicable to heads of a larger size.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. The method of making a magnetic transducer head having a core with a transducer gap therein and having a signal winding around the core at a location away from said transducer gap which comprises the steps of: placing said core within a hollow metal housing; biasing said core toward one inner face of said housing with said transducer gap close to said housing; filling said housing with hardenable non-magnetic casting material; causing said casting material to harden to hold said core and said housing in position relative to each other; and removing housing material and casting material at the location of said one face of said housing to expose said transducer gap in said core and to form a smooth unbroken surface at the location of the transducer gap.

2. The method of making a magnetic transducer head having a core with a transducer gap therein and having a signal winding around the core at a location away from said transducer gap which comprises the steps of: placing said core within a hollow metal housing; placing a spacer between one inner face of said housing and the transducer gap region of said core; biasing said core toward said spacer and said spacer against said one face of said housing; filling said housing with hardenable non-magnetic casting material; causing said casting material to harden to hold said core, said spacer and said housing in position relative to each other; and removing material from said housing, said spacer, and said casting material at the location toward which said core is biased to expose said transducer gap in said core and to form a smooth unbroken surface at the location of the transducer gap.

3. The method of making a magnetic transducer head having a core with a transducer gap therein and having a signal winding around the core at a location away from said transducer gap which comprises the steps of: placing said core within a hollow housing; biasing the transducer gap region of said core toward one face of said housing; establishing an electrical grounding connection between said core and said housing; filling said housing with hardenable non-magnetic casting material; causing said casting material to harden; and removing material from said housing and said casting material at the location adjacent said transducer gap in said core to expose said transducer gap and to form a smooth unbroken surface at the location of the transducer gap.

4. The method of making a magnetic transducer head having a sub-assembly comprising a core with a transducer gap therein and a signal winding around the core at a location away from said transducer gap which comprises the steps of: placing said sub-assembly within a hollow housing formed of magnetic shielding material; holding said sub-assembly in a fixed, oriented position in relation to said housing; while holding said sub-assembly in said position filling said housing with hardenable non-magnetic casting material and causing said material to harden to hold said sub-assembly and said housing in said fixed, oriented position relative to each other; and thereafter removing only a portion of the housing and only a portion of the hardened casting material to expose the transducer gap area of said core and to form a smooth unbroken surface at the location of the transducer gap.

5. The method of making a magnetic transducer head as set forth in claim 4, further characterized in that the removal of a portion only of said housing and said hardened casting material is effected by a tool whose cutting path relative to said head is arcuate whereby the surface of said housing, said casting material and said core which is exposed forms a single smooth arcuate face.

6. The method of making a magnetic transducer head having a sub-assembly comprising a core with a transducer gap therein and a signal winding around the core at a location away from said transducer gap which comprises the steps of: placing said sub-assembly within hollow housing means formed of rigid self-sustaining material; holding said sub-assembly in a fixed, oriented position in relation to said housing means; while holding said sub-assembly in said position filling said housing means with hardenable non-magnetic casting material and causing said material to harden to hold said sub-assembly and said housing means in said fixed, oriented position relative to each other; and thereafter removing a portion of the housing means and a portion of the hardened casting material to expose the transducer gap area of said core and to form a smooth unbroken surface at the location of the transducer gap.

References Cited in the file of this patent

UNITED STATES PATENTS

| | | |
|---|---|---|
| 2,263,485 | Clopton | Nov. 18, 1941 |
| 2,459,299 | West | Jan. 18, 1949 |
| 2,675,429 | Rohling | Apr. 13, 1954 |

FOREIGN PATENTS

| | | |
|---|---|---|
| 429,987 | Great Britain | June 11, 1935 |
| 661,428 | Great Britain | Nov. 21, 1951 |